United States Patent [19]

Gamel

[11] 4,302,425
[45] Nov. 24, 1981

[54] APPARATUS AND PROCESS FOR FLUE GAS DESULPHURIZATION

[76] Inventor: Ronald R. Gamel, 8401 N. Atlantic Ave., Cape Canaveral, Fla. 32920

[21] Appl. No.: 109,143

[22] Filed: Jan. 2, 1980

[51] Int. Cl.³ ............... C01B 17/48; C01B 17/04; B01J 8/02
[52] U.S. Cl. .................... 422/161; 422/160; 422/169; 422/173; 422/182; 423/244; 423/522
[58] Field of Search .............. 422/169, 172, 173, 177, 422/182, 160, 161; 423/242 R, 244 A, 522, 523; 110/215, 216, 345, 210

[56] References Cited

U.S. PATENT DOCUMENTS

| | | | |
|---|---|---|---|
| 1,409,364 | 3/1922 | Dobbs et al. | 423/214 A |
| 3,668,833 | 6/1972 | Cahill | 110/210 X |
| 3,745,751 | 7/1973 | Zey et al. | 423/522 |
| 3,745,939 | 7/1973 | Albritton | 110/216 X |
| 3,752,877 | 8/1973 | Beavon | 423/244 A |
| 3,931,390 | 1/1976 | Palilla | 423/244 R |
| 3,989,798 | 11/1976 | Greene et al. | 423/244 A |
| 4,060,589 | 11/1977 | Hass | 423/244 R |

Primary Examiner—Michael S. Marcus

[57] ABSTRACT

An apparatus and process for removing sulphur components from flue gasses which include $O_2$ and water vapor. The flue gasses are first heated to at least 1000° F. Then $H_2$ is added to the flue gasses for converting at least some of the $SO_x$ components to S and $H_2S$. $H_2O$ is then sprayed into the flue gasses for precipitating particulate matter and for converting at least some of the $H_2S$ components into $H_2SO_4$. The resultant flue gasses are then filtered through lime rock for absorbing any $H_2S$ and $H_2SO_4$ components and for trapping any remaining particulate matter therein. Some of the $NO_x$ components may also be reduced using this process. An apparatus for effecting this process is also disclosed.

7 Claims, 4 Drawing Figures

APPARATUS AND PROCESS FOR FLUE GAS DESULPHURIZATION

BACKGROUND OF THE INVENTION

I. Field of the Invention

The present invention relates to the removal of sulphur and sulphur dioxide components from gas streams, and more specifically to the removal of these and other similar elements from stack gasses and smelter gasses of the type produced from the combustion of hydrocarbons such as coal, etc.

II. Description of the Prior Art

As the cost of petroleum products continues to escalate, many energy intensive industries, and especially electrical generating plants, have investigated the costs required in switching from oil-burning boilers to coal-burning boilers. Since the coal may be obtained from within the continental boundaries of the United States at a much lower price than petroleum distillates, and since the supply of coal is much more reliable than off-shore petroleum supplies, the United States Government has indicated a preference for the use of coal for such combustion requirements consistent with maintaining clean-air standards and other ecological requirements of the surrounding area. However, one of the main problems involved in converting from petroleum combustion to coal combustion boilers is that much of the remaining United States coal supplies contains large amounts of sulphur. During the combustion process this sulphur will combine with available oxygen to produce sulphur dioxide and other similar components. Other undesirable by-products such as nitrogen dioxide and carbon monoxide are produced by insufficient and imperfect combustion.

Many inventors have attempted to eliminate these effluents from stack gasses produced by electrical generating boiler combustion processes. However, present technology has drifted toward the use of gas scrubbers and other various systems which are extremely expensive to construct, install and operate. Other similar systems employ expensive designs such as the use of catalysts for enhancing the chemical process or the use of secondary combustion processes.

Various prior art references are available for evaluating the state of technology in this field. Palilla, in U.S. Pat. No. 3,931,390, discloses a catalytic process for reducing sulphur dioxide in gas streams containing sulphur dioxide to elemental sulphur components using a reducing gas such as hydrogen or preferably carbon monoxide together with a catalyst chosen from $Ln_2O_3$, $Co_2O_3$, where $L_n$ is either Y or Gd. These catalysts are used to enhance the chemical reaction between the elements and compounds existing within the exhaust gas effluent in order to produce elemental sulphur and other contaminents from the exhaust gas effluent.

Hass, in U.S. Pat. No. 4,060,589, discloses a process whereby $No_x$ and $SO_x$ components contained in stacked gasses are simultaneously reduced to $N_2$, $H_2$ and S respectively by passing the stack gasses, which also contain steam and usually some oxygen, over bituminous coke at temperatures between about 900° and 1600° F. The coke effects the simultaneous reduction of $SO_x$ and $NO_x$ components as well as filtering particulate matter from the stack gasses. The coke also produces sufficient hydrogen during the reduction of $SO_x$ and $NO_x$ components such that when the purified gas stream is passed over a conventional hydrogenation catalyst, any residual $SO_2$ present therein will be reduced.

Ehlig, in U.S. Pat. No. 3,865,929, discloses a process whereby a crude hydrogen fluoride gas is fed into a gas cooler. The gas is cooled by evaporating a recirculating liquid stream containing the liquid hydrogen fluoride. This liquid stream removes sulphur impurities from the crude gas. The recirculating stream is recycled through the gas cooler a sufficient number of times until the sulphur impurities accumulate to a particle size that is easily removed by conventional liquid-solid separating techniques such as filtration. Portions of the cooled gas may be removed and subsequently condensed to form crude liquid hydrogen fluoride.

Hammond, in U.S. Pat. No. 3,760,061, discloses a process whereby sulphur dioxide may be oxidized to sulphuric acid by a process that involves contacting the $SO_2$ with an aqueous scrubbing solution of sulphuric acid containing hydrogen peroxide and/or the peroxy acids of sulphur in a gas-liquid contacting device in which the liquid scrubbing phase is made the continuous phase during the actual contacting.

Brown, in U.S. Pat. No. 3,635,000, discloses a process whereby suspended particulate matter, including sulphur-containing compounds of calcium and magnesium, and other sulphur oxides are removed from combustion gasses by passing the gasses successively through a high-velocity venturi-type scrubber and a wetted film-packed bed scrubber. The scrubbing liquid from the venturi scrubber and from the packed bed scrubber may, after being clarified, be recirculated to the two scrubbing stages.

The prior art also includes the teaching of Tolles, in U.S. Pat. No. 3,862,295, Jones, in U.S. Pat. No. 3,715,871, Von Linde in U.S. Pat. No. 2,843,217, Crowley, in U.S. Pat. No. 3,733,788, Saleem, in U.S. Pat. No. 3,907,526, Yamamichi, in U.S. Pat. No. 3,943,230, Paraskezakos, in U.S. Pat. No. 3,812,296, and Teller in U.S. Pat. No. 3,968,482. References also made to various articles relating to stack gas processing which are included in pages 41 through 80 of the February 1978, issue of *CEP MAGAZINE*.

SUMMARY OF THE INVENTION

The present invention relates to an apparatus and process for converting $SO_x$ components in a gas stream, which also includes $O_2$ and water vapor, into $H_2SO_4$ which may subsequently be removed. The process includes the steps of heating the stack gasses to at least 1000° F., and then adding $H_2$ to the heated stack gasses for converting at least some of the $SO_x$ components to S and $H_2S$. Water is sprayed into the stack gasses for precipitating particulate matter therein and for converting at least some of the $H_2S$ components into $H_2SO_4$. The resultant stack gasses are then filtered through limerock for absorbing any $H_2S$ and $H_2SO_4$ components and for trapping any remaining particulate matter therein. Some of the $NO_x$ components will also be reduced and filtered during this process. An apparatus for effecting this invention is also disclosed herein.

BRIEF DESCRIPTION OF THE DRAWINGS

Other objects, features and advantages of the present invention will be apparent from a study of the written description and the drawings in which.

Figure 1:
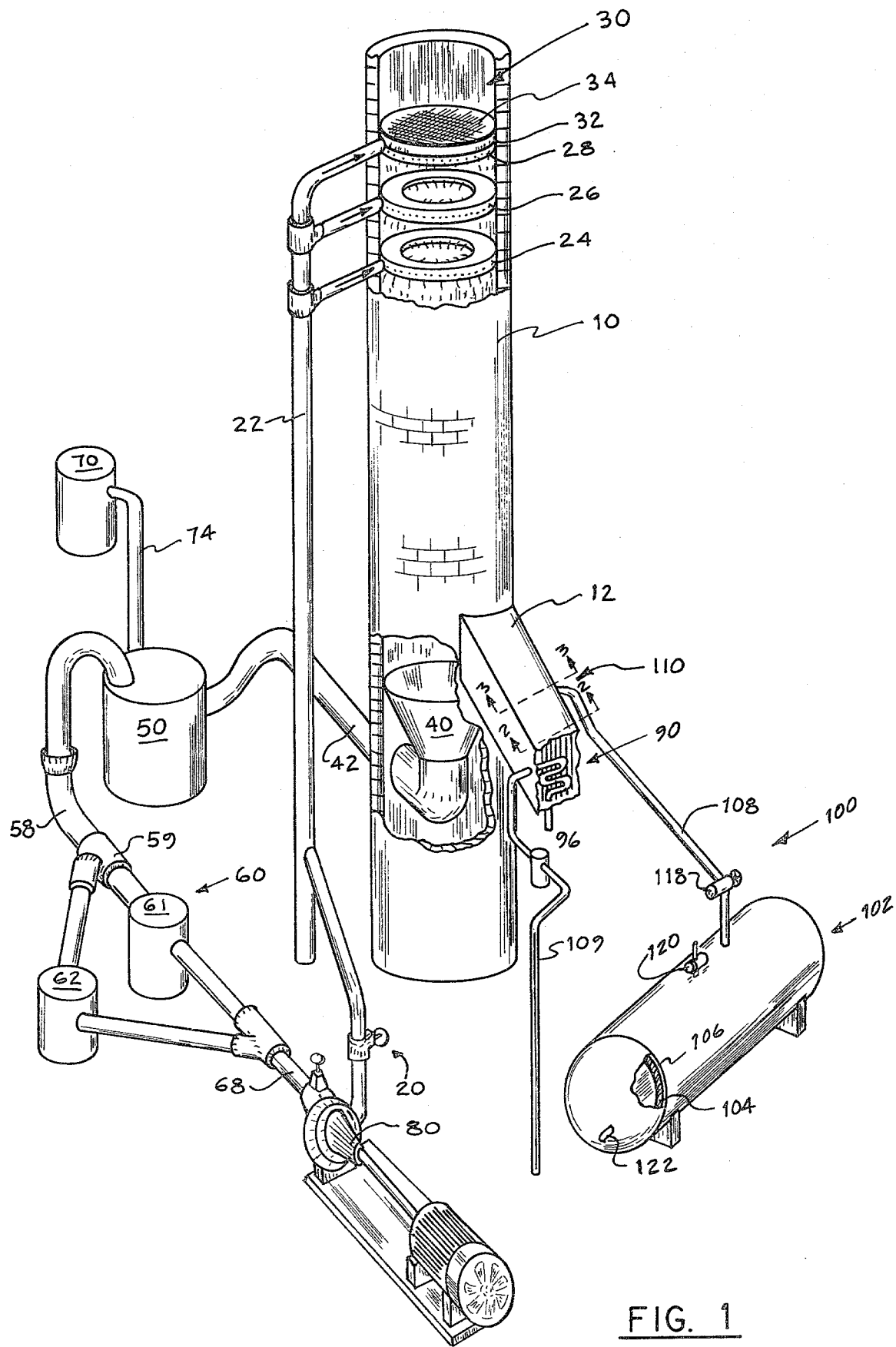
FIG. 1 illustrates a partially cross-sectioned frontal perspective view of a system for removing stack gas effluents in accordance with the present invention.

In the drawings, like referenced characters will refer to like parts throughout the several views of each of the embodiments of the present invention. However, variations and modifications may be effected without departing from the spirit and scope of the concepts of the disclosure, and as defined by the appended claims. It should also be observed that the elements, steps and operation of the embodiments of the present invention have been illustrated in somewhat simplified form in each of the drawings and in the following specification in order to eliminate unnecessary and complicating details which would be apparent to one skilled in this art. Therefore, other specific forms, constructions and methods of the present invention will be equivalent to the embodiments and processes described herein although departing somewhat from the exact appearance of the drawings and steps of the processes.

DETAILED DESCRIPTION OF THE PREFERRED EMBODIMENT

Figure 2:
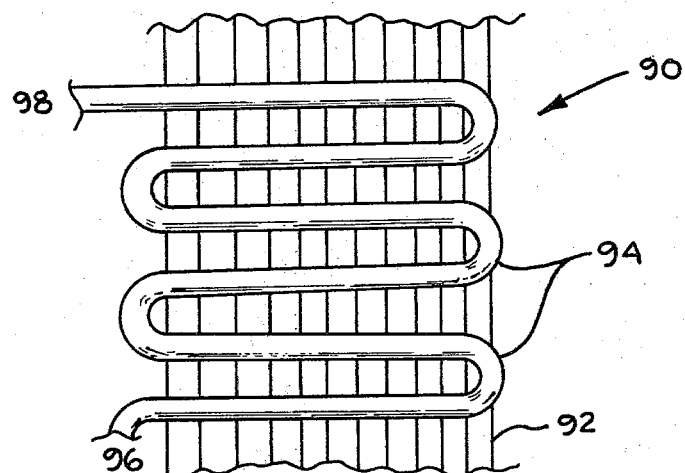
FIG. 2 illustrates a frontal view along section lines 2—2 of FIG. 1 showing the construction of the heater coils within the breech.
Figure 3:
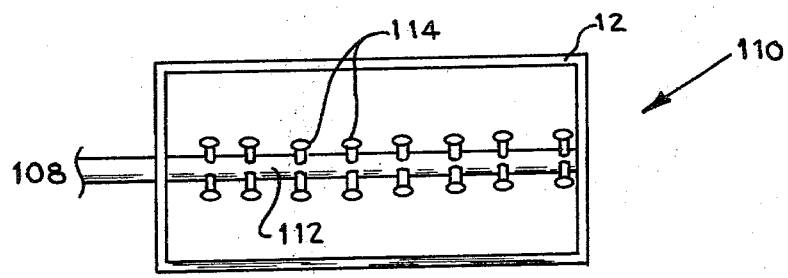
FIG. 3 is a cross-sectioned view taken along section lines 3—3 of FIG. 1 illustrating the various injection heads of the hydrogen injection system.
Figure 4:
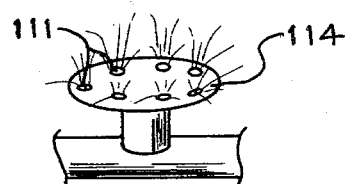
FIG. 4 is a frontal view of a typical one of the injection heads of the hydrogen injection system in accordance with the present invention.

A first preferred embodiment of an apparatus in accordance with the present invention is illustrated generally in FIGS. 1, 2 and 3. The apparatus is shown as associated with a typical electrical generating facility of the type employing coal or fuel oil for the combustion process, with the heat furnished from the combustion process being used to superheat water. The steam produced from the superheated water is transferred through high pressure turbines which run the generators for producing electricity. The present invention relates to an improvement for removing $SO_x$, $NO_x$ and other components from the flue gasses which are produced as a by-product of the combustion process of the fuel oil or coal. While the system as illustrated in the attached drawings is specific in nature, it should be recognized that various modifications will be required in order for the method as disclosed herein to be utilized efficiently with power plant units of various types.

With specific reference to FIG. 1, a water circulation system, shown generally as 20 in the diagram, includes a riser pipe 22 which generally communicates up the outside of a smokestack 10. A plurality of spray rings including a first spray ring 24, a second spray ring 26 and a third spray ring 28 are all located within the inner cylinder defined within the smokestack 10. Each of the spray rings is generally similar in that the water or other liquid which is transported through the riser pipe 22 will be forced from each of the spray rings under high pressure through standard spray nozzles in order to produce a fine mist throughout the upper volume within the smokestack 10. The purpose of the spray mist is to separate the soluble contaminant and particulate matter from the flue gasses and also to wash down an inside surface of the smokestack 10. The volume of the water or other fluid which is sprayed from the spray rings 24, 26 and 28 must be determined according to the rate of flow of the flue gasses traveling through the smokestack 10 and also the level of contaminants within the flue gasses.

A lime rock bed, shown generally as 30 in FIG. 1, is located immediately above the third spray ring 28. Multiple spray nozzles 112 located on the third spray ring 28 should be adjusted so as to at least partially moisten the lime rock within the bed 30. The lime rock bed 30 comprises a screen or mesh-type support structure 32 which traverses the entire diameter of the inside surface of the smokestack 10 so that all of the flue gasses passing therethrough must travel through the lime rock 34 located within the support structure 32. The function of the lime rock 34 is to filter and chemically remove any further impurities which may escape the spraying system as previously described.

While lime rock 34 has been specified as the preferred material for this purpose since it readily absorbs fluids, gasses and often contaminant matter, various other materials could be substituted depending upon the specific requirements of the particular power plant, the availability of the other materials and the type of fuel being used. Lime rock is a good absorber of most of the impurities typically encountered within the smoke stack 10, and because of its basic nature it tends to neutralize the sulphuric acid mist which is created by the combination of the flue gasses and the water. The location of the lime rock bed 30 is typically located adjacent to the top of the smokestack so that the lime rock 34 within the bed can be easily and economically changed at periodic intervals as determined by the requirements of the specific application.

As the water or other liquid used in the water circulation system 20 is atomized through the spray rings 24, 26 and 28, a chemical reaction occurs in which the water molecules will combine or mix with the heated sulphur vapors which are present in the flue gasses, thus producing sulphuric acid, a sulphuric slurry and other by-products. The sulphuric acid liquid and slurry created by this process will either fall through the smokestack 10 or will collect on the inside surface of the smokestack. The continuous flow of water through the water circulation system 20 will cause a flow of water together with the sulphuric acid residue down the inside walls of the smokestack 10 until the slurry and the sulphuric acid liquid are collected within a liquid collector 40 located generally adjacent to a lower section of the smokestack generally beneath a breech section 130.

As illustrated in FIG. 1, the liquid collector 40 may have a generally conical shape with the inside surfaces of the collector being covered with a rubber of a type which is generally inert to the sulphuric acid liquid or slurry. Gravity will feed the slurry and sulphuric acid downwardly and through a collector pipe 42 which exits a lower section of the smokestack 10. A deflector plate is also included on the inside surface of the smokestack 10 in order to reduce the possibility of the sulphuric acid liquid and slurry being ingested into the breech 12.

The resultant sulphuric acid liquid and slurry are pumped through the collector pipe 42 and through a sulphur separator shown generally as 50. In a first preferred embodiment of the present invention, this sulphur separator 50 comprises a device manufactured by the Detroit Edison Company of Detroit, Michigan. The typical model number will be determined by the requirements of the specific application. There are various different types of separators which may be used in this application depending upon the concentration of the sulphuric acid, the other contaminants which may be present, and the flow rate of these products through the separator 50.

A liquid line 74 is coupled to one output of the sulphur separator 50 for transporting the sulphuric acid and slurry into a rubber lined sulphuric acid storage tank shown generally as 70. The sulphuric acid and slurry may be collected over a period of time and then sold as a useful by-product to other chemical manufacturers, drug companies, phosphate processors, etc. Another liquid line 58 is coupled to a second output of the sulphur separator 50 for removing the water or other filtered liquid therefrom. This second liquid line 58 is coupled through a Y-section pipe 59 into a charcoal filtration system, shown generally as 60.

A first charcoal filter 61 typically should be sized so as to handle the entire filtration load, with a second charcoal filter 62 being connected in parallel with the first charcoal filter 61 so that one charcoal filter may be cleaned and repaired while the other one is in service. Both charcoal filters 61 and 62 are typically the same size and capacity as determined by the operating requirements and parameters of the specific application. The outputs of the first and second charcoal filters 61 and 62 are coupled through a Y-section pipe 68 into the suction side of a circulating pump 80. This circulating pump 80 is typically a centrifugal pump of sufficient capacity to lift the water to the full height of the riser pipe 22 with sufficient pressure remaining so as to force the water from the spray rings 24, 26 and 28 as previously described.

One skilled in the art of designing electrical generating stations of the type burning fuel oil or coal will be familiar with the usual design of the smokestack 10, the boiler 14 (not shown for clarity in FIG. 1), and the breech section 12 which couples the exhaust gasses from the boiler 14 and into the smokestack 10. This breech 12 is shown generally in FIG. 1 as a conduit having a generally rectangular cross-section. As the flue gasses rise from within the boiler and pass through the breech 12, they pass through a series of heater coils shown generally as 90 in FIG. 1. As also illustrated in FIG. 2, each of these heater coils 90 includes a steam line input 96 which is coupled to a generally serpentine steam line 94 having an output return 98 which is coupled to a steam trap and return 109.

The serpentine steam lines 94 are designed to provide maximum heat transfer to a plurality of generally parallel fins 92 thermally coupled thereto. As the flue gasses pass adjacent to the steam lines 94 and the fins 92, the flue gasses will be heated as required. The typical temperature of the flue gasses passing from the boiler are on the order of 200° to 300° F. (at the typical flow rates). The present process and method requires that this temperature be elevated to at least 1,000° F. This heating of the flue gasses is accomplished by the heater coils 90, which may also take the form of any thermal efficient heat exchanger which has the capacity, efficiency and size to fit within the breech 12. The heat required to elevate the temperature of the flue gasses is provided by the superheated steam (dry steam) which flows through the input steam line 96 from the high pressure header coupled to the top section of the boiler. The pressure and flow rates of the steam flowing through the heater coils 90 will be determined by the requirements of the specific application, but typically the steam pressure is on the order of 300 psi.

As the flue gasses flow through the heater coils 90 they are heated to the required operating temperature of approximately 1,000° to 1,200° F. The flue gasses then flow through a section of the breech 12 adjacent to a hydrogen injector, shown generally as 110 in FIGS. 1 and 3. This hydrogen injector generally comprises a hydrogen connecting line 108 which couples to a main frame pipe 112 located within a section of the breech 12 between the heater coils 90 and the smokestack 10. While the cross-sectional view as illustrated in FIG. 3 shows the hydrogen main frame pipe 112 as benerally bisecting the breech 12. Other configurations may be adopted depending upon the specific requirements of the particular application. However, the hydrogen main frame line 112 should be routed so as to provide a substantially uniform distribution of the hydrogen gas throughout the breech 12.

As illustrated in FIG. 3, the main frame pipe 112 includes thereon a plurality of heads 114 which are illustrated as being periodically spaced within the breech 12. These heads may be of any suitable type, but the first preferred embodiment of the apparatus in accordance with the process of the present invention utilizes heads having a plurality of high pressure jets 116 thereon. These jets 116 are designed to provide maximum dispersion of hydrogen gas which is forced under pressure through the hydrogen connecting line 108, through the main frame pipe 112 and then through the heads 114. This dispersion pattern will be determined according to the specific requirements of the specific application in question. However, it should be noted that the dispersion must be generally uniform so as to provide sufficient quantities of the hydrogen gas in order to enable the reaction desired in accordance with the present method.

The hydrogen gas is stored within an insulated hydrogen tank shown generally as 102. This hydrogen tank 102 typically has an internal tank structure, an insulation layer 104 and an external tank lining 106. The hydrogen gas is stored under high pressure, with the flow rate of the hydrogen gas through the hydrogen connecting line 108 being determined by the setting of the control valve 118. The hydrogen connecting line is typically a 300 psi stainless steel line which must be insulated in order to minimize heat losses before the hydrogen gas enters the hydrogen injector system 10. The hydrogen tank 102 must be provided with a pressure-relief valve 120 or any similar safety standard as required by local and national safety codes. A loading valve 122 is also illustrated in order to allow efficient and rapid loading of bulk hydrogen from transport vehicles.

After being heated by passage through the heater coil 90, the flue gasses pass through the section of the breech 12 adjacent to the hydrogen injectors 110 where a known quantity of hydrogen gas will be injected. As the hydrogen gas is initially injected into the flue gasses, there will be a mixture of the two components as they comingle and pass into the internal section of the smokestack 10. Once within the smokestack 10 the chemical reaction begins. The hydrogen which is injected into the heated flue gasses will reduce the oxides of sulphur, in the presence of moisture or water vapor from the combustion process and from the water spray rings 24, 26 and 28 into the sulphuric acid and sulphur slurry. The efficiency of this process is improved and encouraged through the rapid reduction in temperature caused by the high pressure injection of water into the smoke stack 10 from the three spray rings 24, 26 and 28. As previously explained, the water which falls through the smokestack 10 and the water which washes down the inside surface of the smokestack will serve to further accelerate this reduction in temperature, thus further improving this chemical reaction.

The chemical reactions which occur within the breech 12 and within the smokestack 10 will basically involve the reduction of the oxides of sulphur (typically sulphur dioxide) to sulphur at high temperatures, or in the alternative at somewhat lower temperatures through the use of catalysts. The following chemical equations are illustrative of the many chemical reactions involved in the reduction of the sulphur dioxide and other undesirable by-products, such as carbon dioxide and carbon monoxide, within the smokestack:
with hydrogen:

$$SO_2 + 2H_2 \rightarrow 2H_2O + S$$

with carbon monoxide:

$$SO_2 + 2CO \rightarrow 2CO_2 + S$$

Two additional side reactions may also occur:
with hydrogen, producing hydrogen sulfide $$SO_2 + 3H_2 \rightarrow 2H_2O + H_2S$$

with carbon monoxide, producing carbonyl sulfide $$SO_2 + 3CO \rightarrow 2CO_2 + COS$$

Various other by-products of the imperfect combustion process such as $NO_x$ components, may also be removed from the stack gasses during this process in accordance with the following generalized chemical reaction:

$$NO_x + 2CO \rightarrow N_2 + 2CO_2$$

These equations are given as examples of the many chemical reactions which may occur within the smokestack 10, and should not be taken as limitations of the present invention. Many other chemical reactions have been discussed by Hass in U.S. Pat. No. 4,060,589, Palilla, in U.S. Pat. No. 3,931,390, Ehlig in U.S. Pat. No. 3,865,929, Hammond in U.S. Pat. No. 3,760,061, and Brown in U.S. Pat. No. 3,635,005. These chemical reactions will not be repeated here, but instead each of the aforementioned patent references will be incorporated by reference as if fully set forth herein.

The simplicity, efficiency and favorable economics of the present process and method should be contrasted with the expensive scrubber systems which are now frequently used in order to meet Environmental Protection Agency air quality standards. Experience has shown that these scrubbers are not as efficient or economical as the present process and system. The scrubbers are very bulky, require a great deal of space for proper operation and are difficult to maintain. The present system minimizes the complexity of the elements which must be inserted into the breech and the smokestack in order to reduce construction and maintenance costs.

While the first preferred embodiment of the present invention is illustrated in FIG. 1 is shown as installed within an already existing smokestack, the scope of the present invention should not be limited to this form. Instead, it may be economically desirable from the point of construction costs, maintenance costs and efficiency of the chemical reactions involved to construct the entire spray ring and lime rock bed combination into a separate frame or conduit which may be placed upon or within the top port of am existing smokestack 10. In the case where the internal diameter of the smokestack 10 is not sufficient to contain the preferred embodiment of the present invention, then the spray rings and lime rock bed may be placed on top of the smokestack so as to be supported thereby. In this manner the size of these elements of the present invention may be determined from the operational requirements of the invention with only secondary consideration given to the space available within the smokestack. On the other hand, it is highly desirable in many circumstances to have the spray rings and lime rock bed mounted upon a separate frame which may be inserted into the top port of an existing smokestack without the necessity of expensive and complicated modifications to the smokestack structure. In this manner minimum down-time will be required in order to retrofit an existing smokestack with the present system, and furthermore periodic maintenance will be easier with a frame and module which may be removed from the smokestack for servicing. In this manner these elements may be optimally designed in accordance with specific requirements of each particular application. Furthermore, maintenance and installation procedures may be drastically simplified through this type of design. It may also be possible to more accurately control the flow rate of the flue gasses through the first, second and third spray rings 24, 26 and 28, as well as through the lime rock bed 30 through the use of such a unitary insertable structure.

In accordance with the provisions of the United States Patent Laws, the preferred embodiment and process of the present invention have been described in detail. The principles of the present invention have been described in the best mode in which it is now contemplated that such principles may be applied. However, it should be understood that the construction shown and described in the attached specification and the drawings are merely illustrative and that the invention is not limited thereto. Accordingly, alterations and modifications which readily suggest themselves to persons skilled in this art, without departing from the true spirit of the disclosure herein, are intended to be included in the scope of the following Claims.

I claim:

1. An apparatus for converting $SO_x$ components in stack gases, which also include $O_2$ and water vapor, into $H_2SO_4$ which may subsequently be removed, said apparatus comprising in combination:
   means defining a breech section;
   means defining a stack connected to and in flow communication with said breech section for passing the stack gases therethrough;
   means for heating the stack gases to least 1000° F. in a reaction area generally defined within said breech section and said stack;
   source means for defining a source of hydrogen;
   injection means operatively coupled to said source means for injecting $H_2$ into said reaction area within said breech section for converting at least some of the $SO_x$ components into S and $H_2S$;
   fluid source means for defining a source of $H_2O$;
   means operatively coupled to said fluid source means and located within an upper section of said stack for spraying $H_2O$ downwardly through said reaction area of said stack for precipitating particulate matter from the stack gases and for converting at least some of the $H_2S$ components into $H_2SO_4$;

liquid collection means spaced below said reaction area of said stack for absorbing any $H_2SO_4$ and the particulate matter suspended in the $H_2O$; and lime rock filtration means spaced above said reaction area of said stack for absorbing any $H_2S$ and $H_2SO_4$ components of the stack gases and for trapping any of the remaining particulate matter therein.

2. The desulphurization apparatus as described in claim 1 wherein said heating means comprises a heat exchanger operatively coupled to a boiler for producing superheated steam.

3. The desulphurization apparatus as described in claim 2 wherein said $H_2O$ spraying means comprises a plurality of ring sprayers located within said smokestack.

4. The desulphurization apparatus as described in claim 3 wherein said lime rock filtration means includes a bed of limestone therein and wherein one of said ring sprayers is operatively juxtaposed with said lime rock filtration means for moistening said limestone bed therein.

5. An apparatus for removing $SO_x$ components in stack gases, which also include $O_2$ and water vapor, flowing from a combustion system through a breech section and out a smokestack, said apparatus comprising in combination:

heat exchanger means carried within the breech section for heating stack gases flowing therethrough to at least 1000° F.;

means defining a source of hydrogen;

first means operatively coupled to said source means for injecting $H_2$ into the breech section adjacent said heat exchanger, but spaced from the smokestack, for converting at least some of the heated $SO_x$ components in the stack gases into S and $H_2S$;

fluid source means for defining a source of $H_2O$;

second means coupled to said fluid source means and located within a top section of the smokestack for spraying $H_2O$ downwardly therethrough for precipitating particulate matter from the stack gases and for enhancing the conversion of at least some of the $H_2S$ components into $H_2SO_4$, whereby the cooling effect of the $H_2O$ spray falling through the smokestack and the stack gases therein will enhance the condensation of vapors and the agglomeration of particulate matter within the stack gases;

liquid collection means located adjacent a lower section of the smokestack for collecting the $H_2SO_4$ and the particulate matter suspended in the $H_2O$; and limerock filtration means spaced above said reaction area for absorbing any $H_2S$ and $H_2SO_4$ components of the stack gases and for trapping any of the remaining particulate matter therein.

6. The desulphurization apparatus as described in claim 5 wherein said second means comprises a plurality of ring sprayers located within an upper section of the smokestack.

7. The desulphurization apparatus as described in claim 6 wherein said limerock filtration means includes a bed of limestone therein and wherein one of said ring sprayers is operatively juxtaposed with said limerock filtration means for moistening said limestone bed therein.

* * * * *